May 24, 1927. Re. 16,628

A. JANER

ASH TRAY

Original Filed Feb. 21, 1925

Inventor
Andrew Janer
attys Bohleber & Ladbetter

Reissued May 24, 1927. Re. 16,628

UNITED STATES PATENT OFFICE.

ANDRE JANER, OF FLUSHING, NEW YORK.

ASH TRAY.

Original No. 1,549,257, dated August 11, 1925, Serial No. 10,777, filed February 21, 1925. Application for reissue filed March 6, 1926. Serial No. 92,970.

This invention relates to ash trays for cigars and cigarettes, particularly the latter, an object being to afford a simple, sanitary, unitary structure adapted to the various requirements and convenience of smokers, a tray which is easily cleaned, and which insures protection against extraneous deposit of ash, spark or remnant.

A further object of this invention is to produce an ash tray which avoids sweating of the cigar or cigarette and this is attained in my improved tray by providing a ventilating structure on which the cigarette is supported with relatively small area of rest or contact between the cigarette and tray.

A lighted cigarette resting in surface contact on a substantially flat surface, if left alone, not only partially or wholly extinguishes itself and burns unevenly but will cause a "sweating" of that portion so supported by or resting upon said surface. This "sweating" of the cigarette, whether wholly or only partially extinguished, results in a pronounced bad taste when smoking of the cigarette is resumed, as every smoker knows, due to the partial or total destruction of the pleasing flavor or rather the subtile aroma thereof. I have found that this sweating of the cigarette is due entirely to the lack of surrounding ventilation and accordingly I have devised an ash tray which has all of the advantages of the ordinary ash tray and at the same time overcomes entirely the objections above referred to and overcomes the objectionable unevenness in the burning thereof.

In the accompanying drawings I illustrate an example of my invention, the construction of which may obviously be varied to best attain the ventilating and non-sweating functions which are among the more important results attained by my invention.

In the embodiment of my invention illustrated the tray is preferably, although not necessarily, made of transparent or translucent material such as glass, so that embellishment imposed on the underside thereof will be visible from above; and for this reason the circumferential supporting or bearing edge *e* of the annular base member *b* protrudes downwardly somewhat beyond the bottom surface of plane *p*.

A ventilating cigarette supporting dais circular wall *d* rises above the upper edge of the ash receiver rim *r*. The dais *d* is integral with the base and is disposed centrally thereof and may be of truncated conoidal form for the purpose of beauty in design and should merge curvilinearly into the bottom portion of the base member *b* of the tray as do also the inner sides of the rim *r* defining the ash receptacle. This curvilinear structure facilitates cleaning while rendering the device symmetrical in appearance.

An upper horizontal wall *f* closes the circular dais wall *d* near its upper end and the wall *f* is parallel to the base *b* and thus forms a hollow internal depression *i* underneath the dais *d*. A thinly drawn circular ridge *d'* adapted to support cigarettes is formed above the dais closing wall *f* and this ridge *d'* is made with a plurality of concave seats *s* for the reception of cigarettes. The horizontal dais closure wall *f* being disposed as high as practical within the vertical dais wall *d* prevents ashes from so readily remaining on the top of the dais and prevents ashes from dropping down into the dais as would occur should I employ an open dais and thus would impair the ventilation which I secure around and about the cigarette with the dais wall *f* properly spaced just below the upper rim of the ridge *d'*.

By disposing the dais closure wall *f* high above the ash receptacle *b*, there is no tendency on the part of the smoker to brush off the ashes onto the dais wall *f* but rather he will be prompted to deposit the ash in the receptacle *b* as intended thereby to leave clean the dais to afford ventilation when the cigarette is next placed thereon.

Figure 2:
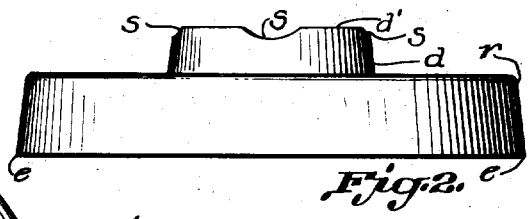
Figure 2 illustrates a side elevation thereof.
Figure 1:
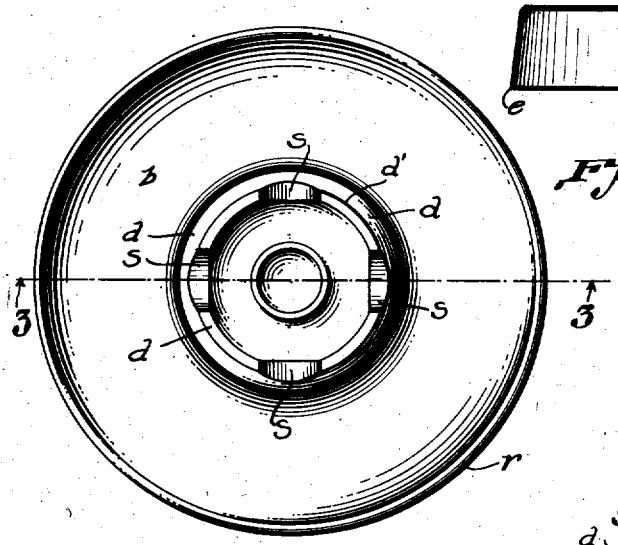
Figure 1 represents a plan view of the preferred embodiment of my invention.
Figure 3:
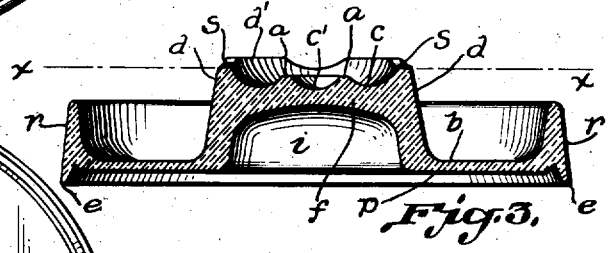
Figure 3 is a section taken upon the line 3—3 of Figure 1.
Figure 4:
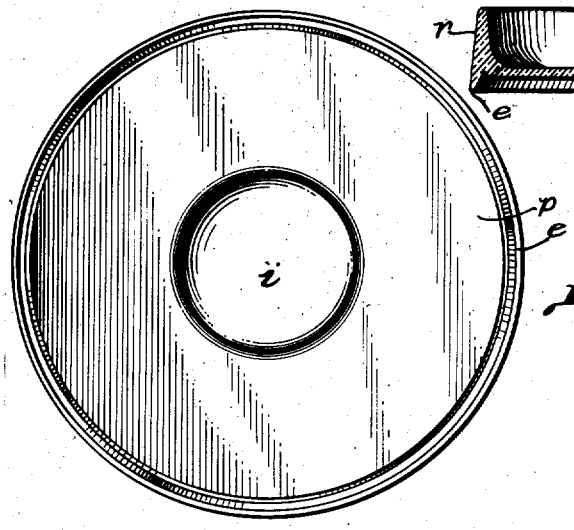
Figure 4 is a bottom plan view of the same.
Figure 5:
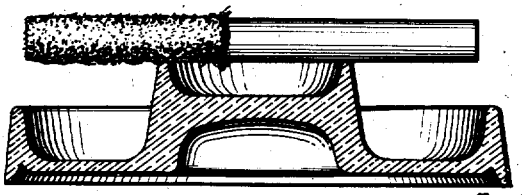
Figure 5 is a view similar to Figure 3 illustrating more clearly how a tray made in accordance with my invention operates in practice.

An inside annular ridge *a* may be formed on the dais wall *f* concentrically within the thinly drawn supporting ridge $d'$. The upper rim of the ridge $a$ may be formed slightly below the plane of the seats $s$ as indicated by the line $x$—$x$ in Figure 3 to avoid interference with free ventilation, and this inside ridge $a$ may be incorporated into the dais wall $f$ to aid in supporting the ashes of a long burning cigarette.

An annular concavity $c$ is formed around the inside ridge $a$ which affords considerable space or clearance between the cigarette and the surface of the dais wall $f$. Likewise the dais wall $f$ is concaved within the ridge $a$, thereby affording ventilating clearance between the cigarette and dais surface at this paint.

The interior $i$ of the dais $d$ is also in the form of a concavity, upon the curvilinear surface of which may be imposed ornamentation or embellishment that will be visible through the sides and the upper surface or wall $f$ of said dais $d$ provided the tray is made of transparent or translucent material.

It will thus be readily understood that a cigar or cigarette placed upon the rester $d$ does not rest upon a flat surface, but upon a plurality of line contact supporting ridges which admits of and is conducive to circulation of air underneath the article or cigarette so placed. This feature is important particularly as to cigarettes, which, if placed upon a flat surface when alight, are subject to "sweat" thereby impairing the taste and flavor of subsequent smoking, and even resulting in the extinguishing of the light and causing unevenness and in burning and destroying the delicacy of the smoke.

In the embodiment illustrated it is preferred that the circumscribing rim $r$ of the ash receptacle $b$ be large enough to insure the deposit and reception within the tray of any remnant, or ash detached or dropping from a cigar or cigarette placed on the top of the dais $d$, and that the height of said dais above the rim precludes the possibility of resting a cigar or cigarette upon and between it and the dais. In other words, the cigar or cigarette, can be properly supported only on the dais and when so supported, its extremities are necessarily within the circumferential rim no matter what the position of rest on the top of the dais may be.

As previously stated I have illustrated herein what I consider the preferred form of my invention but it is to be understood that I do not limit myself thereto, as many changes may be made in points of detail and other embodiments resorted to without deviating from the true spirit and scope of my invention as defined by the annexed claims.

What I claim is:

1. An ash tray of the character designated, formed with a circumscribing rim and a central dais extending above said rim, the upper surface of said dais being formed with a circular ridge having a plurality of seats, and with a concentric annular ridge, and also with a concavity between said ridges, the plane of said central concentric annular ridge being below that of the series of seats in the circular rim of the dais, for the purpose and substantially in the manner set forth.

2. An ash tray of the character designated, formed with a circumscribing rim and a central dais extending above said rim, the upper surface of said dais being formed with a circular ridge having a plurality of seats, and with a concentric annular ridge, and also with a concavity between said ridges, the plane of said central concentric annular ridge being below that of the series of seats in the circular rim of the dais, the underside of said central dais being formed with a concavity, for the purpose and substantially in the manner set forth.

3. An ash tray of the character designated, formed with a circumscribing rim and a central dais extending above said rim, the upper surface of said dais being formed with a circular ridge having a plurality of seats, and with a concentric annular ridge, and also with a concavity between said ridges, the plane of said central concentric annular ridge being below that of the series of seats in the circular rim of the dais, the underside of said central dais being formed with a concavity, and the underside of the tray with a flat annular surface around said concavity in the dais, said annular flat surface being in a plane within that of the bearing edge of the base, for the purpose and substantially in the manner set forth.

4. A tray comprising an ash receptacle formed of an outer rim rising from a flat base, a single dais wall integral with the base and rising above it and above the receptacle rim, a horizontal closing wall integral with the dais wall and disposed above the base and above the rim thereby forming an underneath concave hollow portion, and a cigarette supporting ridge included on the dais wall rising above said horizontal closing wall, said ridge and horizontal closing wall forming a shallow portion to prevent the accumulation of ashes therein.

In testimony whereof I have signed this specification.

ANDRE JANER.